(12) United States Patent
Le Strat et al.

(10) Patent No.: US 6,816,511 B1
(45) Date of Patent: Nov. 9, 2004

(54) TRANSCODING DEVICE PROVIDED WITH A DERIVATION

(75) Inventors: Evelyne Le Strat, Paris (FR); Denis Fauconnier, Paris (FR); William Navarro, Paris (FR)

(73) Assignee: Nortel Matra Cellular, Guyancourt (FR)

(*) Notice: Subject to any disclaimer, the term of this patent is extended or adjusted under 35 U.S.C. 154(b) by 0 days.

(21) Appl. No.: 09/308,976
(22) PCT Filed: Nov. 27, 1997
(86) PCT No.: PCT/FR97/02133
§ 371 (c)(1),
(2), (4) Date: Aug. 16, 1999
(87) PCT Pub. No.: WO98/24255
PCT Pub. Date: Jun. 4, 1998

(30) Foreign Application Priority Data

Nov. 28, 1996 (FR) .............................. 96 14781

(51) Int. Cl.⁷ ................................................. H04J 3/12
(52) U.S. Cl. ...................... 370/523; 370/526; 370/528; 370/529; 370/522
(58) Field of Search .............................. 370/522, 523, 370/526, 527, 529, 286, 496, 525, 524, 528; 375/219

(56) References Cited

U.S. PATENT DOCUMENTS

| | | | |
|---|---|---|---|
| 5,365,576 A | * 11/1994 | Tsumura et al. | 379/93.08 |
| 5,384,807 A | * 1/1995 | Yatim et al. | 375/244 |
| 5,408,524 A | * 4/1995 | Reum | 379/157 |
| 5,420,921 A | * 5/1995 | Lahdemaki | 379/406.04 |
| 5,499,246 A | * 3/1996 | Cooper | 370/345 |
| 5,533,121 A | * 7/1996 | Suzuki et al. | 370/286 |
| 5,768,308 A | * 6/1998 | Pon et al. | 370/287 |
| 6,172,974 B1 | * 1/2001 | Tseng et al. | 370/357 |

* cited by examiner

Primary Examiner—Wellington Chin
Assistant Examiner—Chuong Ho
(74) Attorney, Agent, or Firm—Barnes & Thornburg LLP

(57) ABSTRACT

Transcoder apparatus is designed to transcode a receive signal (UR) into a transmit signal (UE). For this purpose, it includes a signaling transmitting member (14) for producing a signaling message and for introducing it into the transmit signal by stealing bits from said signal. According to the invention, the signaling transmitter member (14) also comprises a tone generator (15) to add a tone signal (UTS) to the transmit signal (UE) prior to applying the signaling message to said transmit signal.

6 Claims, 1 Drawing Sheet

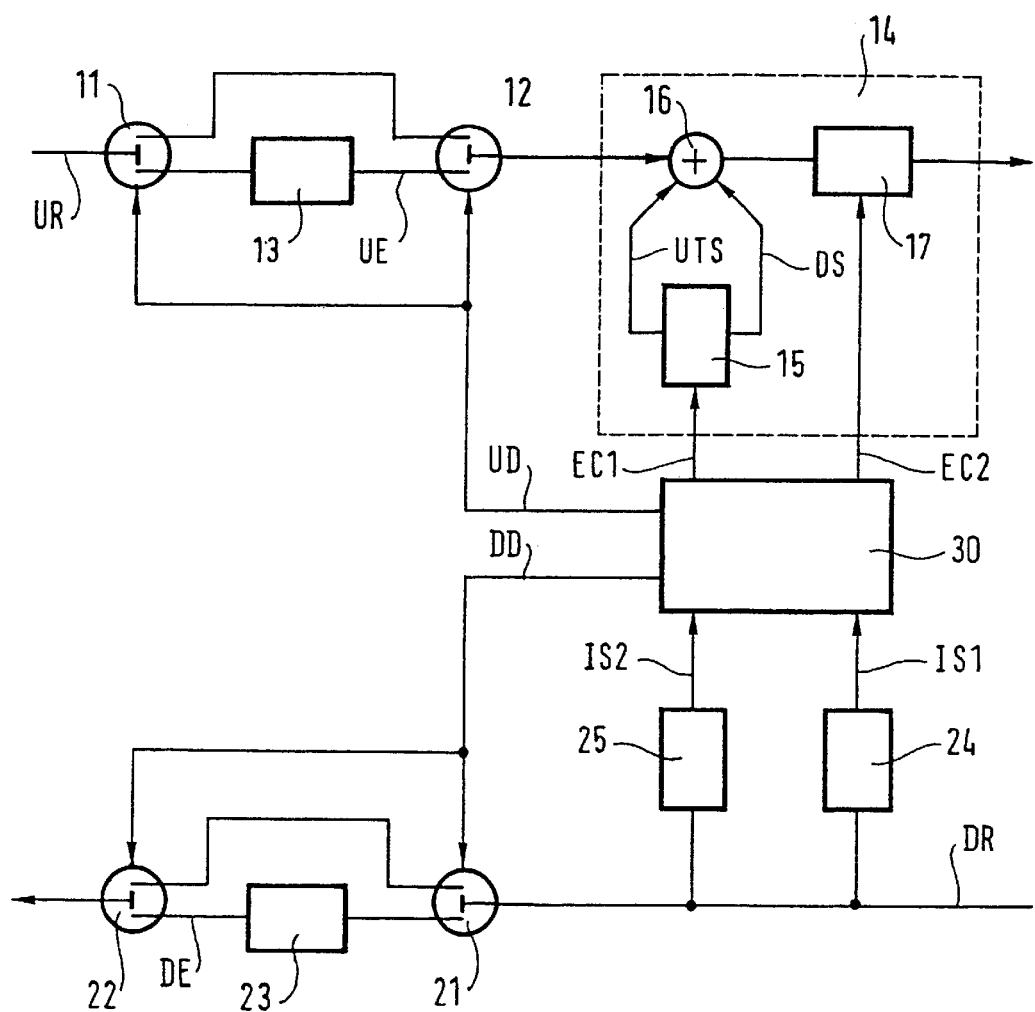

TRANSCODING DEVICE PROVIDED WITH A DERIVATION

The present invention lies in the field of telecommunications and concerns transcoder apparatus. The function of such apparatus is to transform a receive signal that has been subjected to first encoding in a first network into a transmit signal satisfying second encoding used in a second network, it being understood that the signal in question is traveling from the first network to the second.

By way of example, the first network can be a GSM network for radio communication with mobile stations, and the second network can be the public switched telephone network (PSTN). In common practice, an analog speech signal is digitized in the form of 13-bit samples at a rate of 8 kHz, giving a data rate of 104 kilobits per second (kbps). At present, GSM provides for three types of encoding: full rate encoding, improved full rate encoding, and half-rate encoding which, starting from a signal at 104 kbps, produce signals that are respectively at 13 kbps, 12.2 kbps, and 5.6 kbps. The PSTN encodes the 104 kbps signal into a so-called "PCM" signal at 64 kbps using the A law or the $\mu$ law, depending on country. Thus, a call coming from a GSM subscriber and going to a PSTN subscriber requires transcoding to transform the GSM encoded speech signal into a PCM encoded signal in the up link and for performing the opposite operation in the down link, where by convention the "up link" starts from the calling subscriber while the "down link" connects the called subscriber to the calling subscriber in the opposite direction.

It can also happen that a GSM subscriber makes a call to another GSM subscriber with the call transiting over the PSTN. Assuming that both subscribers are using the same GSM encoding, it can be seen that the GSM signals are subjected to two successive transcoding stages, one from GSM to PCM, and the other from PCM to GSM. These two transcoding stages are pointless since the overall purpose thereof is to reproduce a signal that is identical to the starting signal. In addition, such double transcoding significantly degrades the speech signal.

On this topic, International application CA 95/00704 proposes a system for avoiding two transcoding operations whenever possible. In that system, a transcoder device comprises a first transcoder which receives a signal originating from the mobile network and transcodes it to produce a transmitted signal. That device also has a generator to produce a digital signaling message indicating that the transmitted signal comes from a mobile subscriber and that, consequently, the signal received by said device has been subjected to coding specific to the mobile network. The signaling message is injected into the transmitted signal by stealing bits therefrom, i.e. some of the bits in the transmitted signal are replaced by bits of the signaling message. It is assumed that the transmitted signal travels over the PSTN. If this signal is destined for another mobile subscriber, it will be applied to a second transcoding device. A detector is thus provided in the second device to look for the signaling message coming from the first device. It will be understood that under such circumstances, both devices are identical and that each of them therefore possesses both a generator and a detector. Consequently, when the second device has detected that the first device is sending it a signal that comes from the mobile network, it uses its own generator to tell the first device that it has indeed received its signaling message and that it is likewise connected to a subscriber of the mobile network. It is then possible to eliminate the transcoding operations in the transcoders of each of the devices.

It should also be observed that subscribers to the PSTN gain access to that network over an analog local loop. A connector member connects said local loop, which has two wires, to the network proper by means of a hybrid circuit and a four-wire connection. Unfortunately, it often happens that the impedance matching of said connection member is of poor quality. This phenomenon gives rise to an echo known as "electrical" echo. This echo is not perceivable, providing transmission times are short, as is the case in the PSTN. However, in mobile networks, e.g. the GSM network, the go and return transmission time is subject to a delay of about 200 milliseconds (ms) and electrical echo can be very troublesome. Echo cancellers, where the term "echo cancellers" is used herein to cover both echo cancellers proper and echo suppressors, are therefore disposed in the mobile network on links coming from the PSTN. Echo cancellers should only be used for calls between a mobile subscriber and a PSTN subscriber. However, the mobile network control center does not always know how to tell whether a given subscriber is a mobile subscriber or a PSTN subscriber. As a result, echo cancellers are often used in calls between mobile subscribers.

Echo cancellers are digital signal processor members which serve, essentially, to modify the digital signal input thereto. This applies naturally to the signaling message received by a transcoding device from the PSTN. It follows that if the integrity of the message is affected, the device will not be able to identify the received message and will therefore not be able to tell whether the call in question involves two mobile subscribers. Under such circumstances, the procedure for eliminating double transcoding cannot be implemented.

It may be observed that such degradation of the signaling message could be due to a processor member other than an echo canceller. Such members are provided for processing audio signals and are therefore not appropriate for forwarding digital signaling. Filters can be mentioned by way of example.

An object of the present invention is thus to provide transcoding apparatus which takes the above constraints into account whether they are imposed by the mobile network or by the PSTN.

According to the invention, the transcoding apparatus designed to transcode a receive signal into a transmit signal in an up link, includes a signaling transmitter member for producing a signaling message and for introducing it into the transmit signal by stealing bits therefrom, and said signaling transmitter member also has a tone generator for adding a tone signal to said transmit signal prior to introducing said signaling message into the transmit signal.

The fundamental characteristic of the tone signal is a frequency and not a digital value as is the case of the signaling message. The tone signal will therefore pass through the or all of the processor members without losing its fundamental characteristics, even if it is subjected to attenuation or possibly amplification. Furthermore, inserting the signaling message into the transmitted signal after the tone signal has been added is practically of no consequence. The signaling message can be considered to be white noise of very low amplitude.

In addition, the apparatus is also designed in a down link to transcode a receive signal into a transmit signal, and it can have a detector for seeking a tone signal and a signaling message in the signal received by said down link.

This dual signaling by means of the tone signal and by means of the signaling message makes it possible to obtain detection advantages that are described in greater detail below in the description.

Naturally, the apparatus has means for not transcoding the signals received by the up and down links when the signaling message detected in the signal received by the down link so requires.

According to an advantageous characteristic of the invention, the apparatus includes means responsive to the tone signal detected in the signal received over the down link to produce a deactivation signal for application to any transmission-degrading processor member placed in the up and down links.

In particular, said processor member consists in an echo canceller.

Preferably, when the transmit and receive signals correspond to a speech signal restricted to a predetermined passband, the transcoder apparatus is adapted so that the tone signal is situated outside said passband.

The invention is described below in greater detail in the following description of an embodiment that is proposed by way of illustration with reference to the sole accompanying FIGURE which is a block diagram of transcoding apparatus.

The description below relates to the invention being applied to the GSM network and the PSTN, since those two networks are now in widespread use. The person skilled in the art will have no particular difficulty in applying the invention to some other configuration.

Initially, the structure of the apparatus enabling the invention to be implemented is described with reference to the FIGURE, after which the operation of the apparatus is described in detail, given the various elements constituting it.

The apparatus thus receives via the up link a receive signal UR on the input of a first switch 11 which has two outputs and which is controlled by an up bypass signal UD. The receive signal is in the format of a transcoder remote adaptor unit (TRAU) frame. These frames at full data rate and at half-rate are described in GSM recommendations 08.60 and 08.61 respectively. A second switch 12 controlled by the same up bypass signal UD has two inputs and one output. The first output of the first switch 11 is connected directly to the first input of the second switch 12, while the second output of the first switch 11 is connected to the second input of the second switch 12 via a first transcoder 13. Thus, depending on the nature of the up link bypass signal UD, the output from the second switch 12 corresponds either to the receive signal UR as received over the up link, or else to the transmit signal UE as transmitted into the up link by the first transcoder 13.

The transcoder apparatus also comprises a signaling transmitter member 14 also associated with the up link. This member essentially comprises a tone generator 15, an adder 16, and a message generator 17.

The tone generator 15 is designed to produce an up tone signal UTS comprising one or more tones in response to a first transmit control signal EC1. The tone(s) produced by one or more oscillators, for example, correspond to respective substantially pure frequencies. Advantageously, the or each frequency is selected to lie outside the passband of the speech signal in the up link. The telephone band of the PSTN has a bottom cutoff frequency of 300 Hz. Furthermore, all three GSM encoders have a high pass filter function whose cutoff frequency is greater than or equal to 80 Hz. It is therefore preferable to select tones of frequency lower than 80 Hz so that said tones remain inaudible. It is also possible to select tones of frequency above the passband since they will then be eliminated by the bandpass filtering of the digital-to-analog converter which is used for reproducing the analog speech signal to the corresponding subscriber.

The tone generator 15 is also designed to produce a deactivation signal DS for application to an echo canceller, if any, which signal is also referred to as an inhibit signal in the technical literature. The deactivation signal DS is another tone, different from the preceding tone(s), and is specified in UIT-T recommendations G164 and G165. It is constituted by a sinewave centered on the frequency of 2100 Hz with a phase inversion every 450 milliseconds. The deactivation signal is produced for a duration that is long enough to enable the echo canceller to take account of it, i.e. about 1 second (s) to 2 s. It is generated by the transcoder apparatus in charge of the calling subscriber. In order to avoid inconveniencing the called subscriber, the transcoding apparatus in charge of the called subscriber is advantageously provided with means for filtering said deactivation signal at 2100 Hz. It is also recalled that the conditions under which echo canceller deactivation signals should be transmitted are described in UIT-T recommendation V25.

The adder 16 sums the signal present at the output from the second switch 12, the up tone signal UTS, and the deactivation signal DS.

The message generator 17 introduces a signaling message in the signal output by the adder 16 in response to a second transmit control signal EC2, with this being done by the technique known as "bit stealing". This generator does not need to be described in greater detail since it forms part of the state of the art.

The signaling message specifies the encoding used in the up link receive signal UR and possibly also the encoding that appears in the transmit signal UE on the same up link. Advantageously, this message also specifies whether the subscriber from which the receive signal UR originates can use one or other of the encoding techniques, and if so, which techniques.

Now that the elements of the transcoding apparatus that are associated with the up link have been described, it is appropriate to refer to use which are associated with the down link.

The apparatus receives over the down link a receive signal DR on the input of a third switch 21 which has two outputs and which is controlled by a down link bypass signal DD. A fourth switch 22 controlled by the same down link bypass signal DD has two inputs and one output. The first output of the third switch 21 is connected directly to the first input of the fourth switch 22, while the second output of the third switch 21 is connected to the second input of the fourth switch 22 via a second transcoder 23. Thus, depending on the nature of the down bypass signal DD, the output from the fourth switch 22 corresponds either to the receive signal DD received over the down link, or to the transmit signal DE in the up link as produced by the second transcoder 23.

The input of the third switch 21 is connected firstly to a tone detector 24 and secondly to a signaling message detector 25.

The tone detector 24 is designed to identify the various tones that may appear in a tone signal such as that described above and present in the receive signal DR on the down link. By way of example, this tone detector may comprise a pair of filters for each of the tones. Each pair is constituted by a bandpass filter and by a band stop filter both centered on the frequency to be detected. A tone is detected by combining these two filters for a duration of about 500 ms. The detector identifies the tones it detects in a first identification signal IS1.

In this case, the signaling message detector 25 receives messages of length L in the receive signal DR of the down link. This signal is encoded in PCM format, so that it is in the form of a succession of 8-bit samples at a rate of 8 kHz. The signaling message is obtained by stealing one bit, e.g. the first bit, from every N samples. In which case, the detector 25 has N shift registers and means for extracting the bit whose position corresponds to the position of the bits stolen from each of the samples. By selecting a first integer variable $i$ that is positive and less than or equal to N, and a second integer variable $k$ that is positive or zero and less than L, the shift registers of length L are loaded so that the (i+k.N)-th bit extracted from the receive signal DR is written into the i-th shift register. As soon as L.n bits have been extracted, the contents of each shift register is compared with each of the possible values of the signaling message, and this operation is repeated each time N new bits have been extracted. In the event of a match between the contents of one of the shift registers and one of the possible values for the signaling message, the message detector 25 communicates this match by means of a second identification signal IS2.

Finally, the transcoder apparatus has a control member 30 such as a microcontroller which produces bypass signals in the up link UD and in the down link DD, which produces the first and second transmit control signals EC1 and EC2, and which receives the first and second identification signals IS1 and IS2. The operation of this member will appear from the description below of the general operation of the apparatus.

When the calling subscriber requests a call, a first transcoder apparatus is activated and it thus receives a receive signal UR over the up link. The control member 30 of said apparatus activates the first and second transcoders 13 and 23. It therefore generates the up bypass signal UD and the down bypass signal DD so that the output of the second switch 12 and the output of the fourth switch 22 is connected respectively to the output of the first transcoder 13 and of the second transcoder 23. Nevertheless, a certain length of time is required to set up the call end to end, and until that length of time has elapsed, the apparatus receives via the down link a receive signal DR that is identical to the signal UE it has transmitted on the up link. The control member 30 produces the second transmit control signal EC2 so that the message generator 17 produces a random message. This random message is selected to be long enough to ensure that the probability of a second transcoder apparatus to which the message is sent using the same signal is very low. During this call set up stage, the message detector 25 of the first apparatus thus receives the random message and transfers it to its own control member 30 by means of the second identification signal IS2. In contrast, when this message is no longer received, that means that the call has been set up.

In a first variant, the control member 30 of the first apparatus then produces a first transmit control signal EC1 such that the tone generator 15 produces a first up tone signal UTS comprising a single tone. When the second transcoder apparatus has detected the first tone signal, it produces a second tone signal which it sends to the first apparatus. Naturally, the second apparatus also activates its two transcoders as soon as the call has been set up.

If the tone detector 24 of the first apparatus has not recognized the second tone signal after a certain length of time has elapsed, the control member 30 of this apparatus is informed by the second identification signal IS1, and it changes neither the up bypass signal UD nor the down bypass signal DD.

However, if the control member 30 is informed that the second tone signal has been received, it then uses the second transmit control signal EC2 to cause the message generator 17 to produce a signaling message specifying the nature of the coding applied to the signal UR received by the up link, and it produces a deactivation signal DS for application to any echo canceller. The message detector 25 then looks for an acknowledge message as sent by the second apparatus and received by the receive signal DR on the down link, and it informs the control member 30 by means of the second identification signal IS2.

If the acknowledge message specifies that the nature of the coding applied to the signal UR received by the first apparatus is unsuitable for the second apparatus, then the control member 30 of the first apparatus modifies neither the up bypass signal UD nor the down bypass signal DD, as in the event of the second tone signal not being detected.

However, if the acknowledge message specifying the nature of the coding is suitable, then the control member 30 deactivates the two transcoders 13 and 23. It then produces the up bypass signal UD and the down bypass signal DD in such a manner that the signal UR received over the up link is applied to the output of the second switch 12 and the signal DR received over the down link is applied to the output of the fourth switch 22. Naturally, the second transcoder apparatus also deactivates both transcoders.

This variant has the advantage of using only one tone in the tone signal.

In a second variant, the tone signal has an appropriate number of tones to enable signaling messages to be produced by the message generator 17 that are also capable of being encoded by means of these tones.

Signaling redundancy is thus applied by means of digital messages and by tones on transmission over the up link from the first apparatus. Secondly, on reception, the mode of operation is similar to that of the first variant except that the tone detector 24 and the message detector 25 operate in parallel, with the first of these two detectors that identifies the messages or the tones sent by the second apparatus informing the control member 30 by means of the appropriate identification signal IS1, IS2. The control member 30 controls the four switches 11, 12, 21, 22 as in the first variant.

This variant is a little more complex to implement than the preceding variant, but it makes it possible to come to a decision on the appropriateness of dual transcoding more quickly. It takes much longer to detect tones than it does to detect digital messages. If the messages sent by one transcoder apparatus are received in full by the other apparatus, then the invention can be implemented in a minimum of time.

It will also be observed that when a call is set up between two GSM subscribers, elimination of double transcoding can fail if both subscribers are not using the same kind of encoding, for example if the calling subscriber is using half-rate encoding while the called subscriber does not have that facility available.

The invention also provides a solution for improving this situation by means of signaling messages, and this applies both to the first variant and to the second.

In a first option, each transcoding apparatus informs the other apparatus of all of the encoding options available to the subscriber with which it is associated, and it does so by means of the signaling messages. By way of example, provision can be made in each apparatus to have the same two-entry table, one entry for the local apparatus and the other for the remote apparatus, which thus correspond to these possibilities. For each pair of entries there is associated either a single form of encoding common to both subscribers, or else coding incompatibility. If a common form of encoding exists, then this is communicated to both of the subscribers concerned so as to cause them to adopt this form of encoding. When they are incompatible, the control members of the two apparatuses then make use of their respective transcoders.

In a second option, the two apparatuses interchange information about the encoding options available to the subscribers with which they are associated, and they do so, as before, by means of signaling messages. This interchange of information is performed using a protocol that is not described in detail since it lies outside the ambit of the present invention and, furthermore, such a protocol presents no difficulty for the person skilled in the art.

In addition, the invention is not limited to the embodiments described above. In particular, the person skilled in the art will readily understand that the initiative of the procedure for suppressing double transcoding, where possible, can also lie with the second transcoding apparatus associated with the called subscriber instead of lying with the first transcoding apparatus associated with the calling subscriber. Similarly, the deactivation signal can equally well be produced by the second transcoding apparatus associated with the called subscriber as with the first transcoding apparatus associated with the calling subscriber.

Naturally, any of the means shown can be replaced by equivalent means without going beyond the ambit of the present invention.

What is claimed is:

1. Transcoding apparatus designed to transcode a receive signal (UR) into a transmit signal (UE) in an up link, the apparatus including a signaling transmitter number for producing a signaling message and for introducing it into the transmit signal (UE) by stealing bits therefrom, said signaling transmitter member also having a tone generator for adding a tone signal (UTS) to said transmit signal (UE) prior to introducing said signaling message into the transmit signal, the apparatus being further being designed to transcode a receive signal (DR) into a transmit signal (DE) in a down link, including a detector to look for a tone signal and a signaling message in the signal received (DR) over said down link, and including means for not transcoding said signals (UR, DR) received over said up and down links when the signaling message detected in the signal (DR) received via the down link so requires.

2. Apparatus according to claim 1 including means responsive to the tone signal detected in the signal (DR) received over the down link to produce a deactivation signal (DS) for the application to any transmission-degrading processor member placed in the up and down links.

3. Apparatus according to claim 2, in which said processor member consists in an echo canceller.

4. Apparatus according to claim 1, in which said transmit and receive signals correspond to a speech signal restricted to a predetermined passband, said tone signal (UTS) lying outside said passband.

5. Apparatus according to claim 4, in which said tone signal (UTS) lies below the passband.

6. Apparatus according to claim 4, in which said tone signal (UTS) lies above said passband.

* * * * *

UNITED STATES PATENT AND TRADEMARK OFFICE
CERTIFICATE OF CORRECTION

PATENT NO. : 6,816,511 B1
DATED : November 9, 2004
INVENTOR(S) : Evelyne Le Strat et al.

It is certified that error appears in the above-identified patent and that said Letters Patent is hereby corrected as shown below:

Column 8,
Line 1, "signaling transmitter number" should read -- signaling transmitter member --.

Signed and Sealed this

Twenty-seventh Day of December, 2005

JON W. DUDAS
*Director of the United States Patent and Trademark Office*